US012773782B2

(12) United States Patent
Hu et al.

(10) Patent No.: US 12,773,782 B2
(45) Date of Patent: Oct. 27, 2026

(54) ACTIVE SUPPORT FOR INDUSTRIAL ROBOTS

(71) Applicant: FANUC AMERICA CORPORATION, Rochester Hills, MI (US)

(72) Inventors: Xin Hu, Ann Arbor, MI (US); Yi Sun, Bloomfield Hills, MI (US); Matthew DeNio, Clarkston, MI (US); Nivedhitha Giri, Farmington Hills, MI (US); Eric Flanagin, Ortonville, MI (US); Robert Totten, Lake Orion, MI (US)

(73) Assignee: FANUC America Corporation, Rochester Hills, MI (US)

( * ) Notice: Subject to any disclaimer, the term of this patent is extended or adjusted under 35 U.S.C. 154(b) by 100 days.

(21) Appl. No.: 18/659,326

(22) Filed: May 9, 2024

(65) Prior Publication Data

US 2025/0345938 A1 Nov. 13, 2025

(51) Int. Cl.
*B25J 9/16* (2006.01)

(52) U.S. Cl.
CPC ........... *B25J 9/1674* (2013.01); *B25J 9/1653* (2013.01)

(58) Field of Classification Search
CPC ...... B25J 9/1674; B25J 9/1653; B25J 9/1602; B25J 9/1628; B25J 9/163; B25J 9/1676; B25J 9/1689; G05B 2219/14084; G05B 2219/21099; G05B 2219/24048; G05B 2219/31104; G05B 2219/33284; G05B 2223/06; G05B 2219/14058; G05B 2219/24053; G05B 2219/32408; G05B 2219/33303; G05B 2219/39412
See application file for complete search history.

(56) References Cited

U.S. PATENT DOCUMENTS

| | | | | |
|---|---|---|---|---|
| 6,591,296 | B1 * | 7/2003 | Ghanime | G06F 11/0769 709/224 |
| 7,127,325 | B2 * | 10/2006 | Nagata | G05B 19/4063 340/7.45 |
| 10,335,962 | B1 * | 7/2019 | Rosenberg | B25J 9/1674 |
| 2014/0336795 | A1 * | 11/2014 | Asenjo | G05B 19/4083 700/86 |
| 2018/0373852 | A1 * | 12/2018 | Tsubota | G05D 1/0055 |
| 2019/0176332 | A1 * | 6/2019 | Galloway | G05B 19/4185 |
| 2020/0398447 | A1 * | 12/2020 | Hirose | B25J 19/06 |

(Continued)

*Primary Examiner* — Esvinder Singh
(74) *Attorney, Agent, or Firm* — John A. Miller; Shumaker, Loop & Kendrick, LLP

(57) ABSTRACT

A system and methods for automated support for industrial robots. The system includes a data collection device which communicates with all robots at a customer site, and uploads data to a remote diagnostic system. The method is activated either automatically when an alarm occurs, or by the robot operator or a remote support team. Upon activation, particular diagnostic files are captured and sent from the affected robot's controller to the data collection device and on to the remote diagnostic system. The system employs a knowledge base to diagnose the cause of the issue from the diagnostic files, and support team personnel are also involved to reach a diagnosis. Based on the diagnosis, updated software or configuration files are sent to the affected robot to correct the issue and allow the robot to return to service, instructions are provided to the robot operator, or an on-site service technician visit is scheduled.

20 Claims, 4 Drawing Sheets

(56) References Cited

U.S. PATENT DOCUMENTS

| | | | | |
|---|---|---|---|---|
| 2021/0237269 | A1* | 8/2021 | Hvass | B25J 9/1674 |
| 2021/0323156 | A1* | 10/2021 | Couvignou | B25J 9/102 |
| 2022/0024038 | A1* | 1/2022 | Sun | B25J 9/1674 |
| 2023/0324898 | A1* | 10/2023 | Roux | G05B 23/0275 714/26 |
| 2024/0069550 | A1* | 2/2024 | Wu | B25J 9/1689 |
| 2025/0121496 | A1* | 4/2025 | Jinandra | B25J 9/1697 |
| 2025/0196318 | A1* | 6/2025 | Yamaguchi | B25J 5/007 |

* cited by examiner

ACTIVE SUPPORT FOR INDUSTRIAL ROBOTS

BACKGROUND

Field

The present disclosure relates to the field of support services for industrial robots and, more particularly, to a system and methods for providing automated support for industrial robots which is activated when an issue is detected, establishes communication between the remote support system and the robot controllers at the customer site, sends diagnostic files from the affected robot controller to the remote support system, diagnoses the cause of the issue, and sends corrective data and/or instructions to the affected robot from the remote support system.

Discussion of the Related Art

The use of industrial robots to perform a wide range of manufacturing, assembly and material movement operations is well known, and modern manufacturing facilities often use a variety of robots to automate production processes. Robots offer significant advantages over human labor for many factory operations—including speed and reliability of task performance, the ability to work in a hazardous environment such as a spray painting booth, and the ability to repeatedly lift and move heavy items. However, industrial robots are not without problems. Like any machine, robots are susceptible to various issues affecting their operation—known as faults, errors, failure modes, etc. These issues can occur in software running on a robot controller, or they can affect mechanical components of the robot such as bearings or electrical components such as joint motors.

When an issue occurs with a robot, in many cases the problem requires the robot to be taken out of service. It is therefore imperative that the issue be diagnosed and corrected as soon as possible, in order to minimize the downtime and lost productivity. This is especially true in light of the fact that when one robot is taken out of service it can adversely affect many other devices. For example, in a progressive stamping line, with a series of stamping presses and tending robots, if one tending robot is taken out of service, the entire stamping line is down until the robot is repaired and returned to service.

Various methods have been used to attempt to minimize robot downtime. Many robot customers employ proactive measures which monitor many parameters of robots operating in a factory, and use data analytics and prognostics to identify potential problems before failures occur. These techniques are effective in that they allow robot components to be inspected, serviced and/or replaced during regular preventive maintenance activities, and thereby reduce the number of issues which occur unexpectedly during production operations. However, in spite of these proactive measures, robots still experience issues which result in downtime.

When an issue occurs during robot operations, an alarm activates on the robot controller, indicating the nature and severity of the warning or error. In some cases, a robot operator can perform a simple maintenance or repair action and return the robot to service. However, in many cases, robot operators do not have the knowledge or experience necessary to understand the details of an alarm code, or to undertake the repairs necessary to correct the underlying issue. In these cases, the operator must contact the robot manufacturer's service center and request service assistance.

It is known for the robot manufacturer's service center to have a network connection to a server device at the customer site, where the server device in turn is in communication with all of the robot controllers at the site. This communication network enables the transfer of data files from the affected robot's controller to service center technicians who can then attempt to resolve the issue. However, existing methods require the service center technician to explain to the robot operator what data files to look for, and the operator must then manually email the files to the remote technician. Sometimes this process occurs two or three times, as the technician identifies that additional data is needed. Furthermore, critical data about the status of the robot at the instant the issue occurred may be lost forever if the controller is rebooted.

In light of the circumstances described above, there is a need for an improved system and methods for providing automated support for industrial robots which enables rapid and reliable diagnosis and repair of robot issues.

SUMMARY

In accordance with the teachings of the present disclosure, a system and methods for automated support for industrial robots are provided. The system includes a data collection device which communicates with all robots at a customer site, and uploads data to a remote diagnostic system. The method is activated either automatically upon detection of an issue, by the robot operator when an alarm is displayed on a robot controller, or by a remote support team. Upon activation, particular diagnostic files are captured and sent from the affected robot's controller to the data collection device and on to the remote diagnostic system. The system employs a knowledge base to attempt to diagnose the cause of the issue from the diagnostic files, and the support team personnel are also involved to reach a diagnosis. Based on the diagnosis, updated software or configuration files are sent to the affected robot to correct the issue and allow the robot to return to service, instructions are provided to the robot operator, and/or an on-site service technician visit is scheduled when more complicated repairs are required.

Additional features of the presently disclosed systems and methods will become apparent from the following description and appended claims, taken in conjunction with the accompanying drawings.

DETAILED DESCRIPTION OF THE EMBODIMENTS

Figure 1:
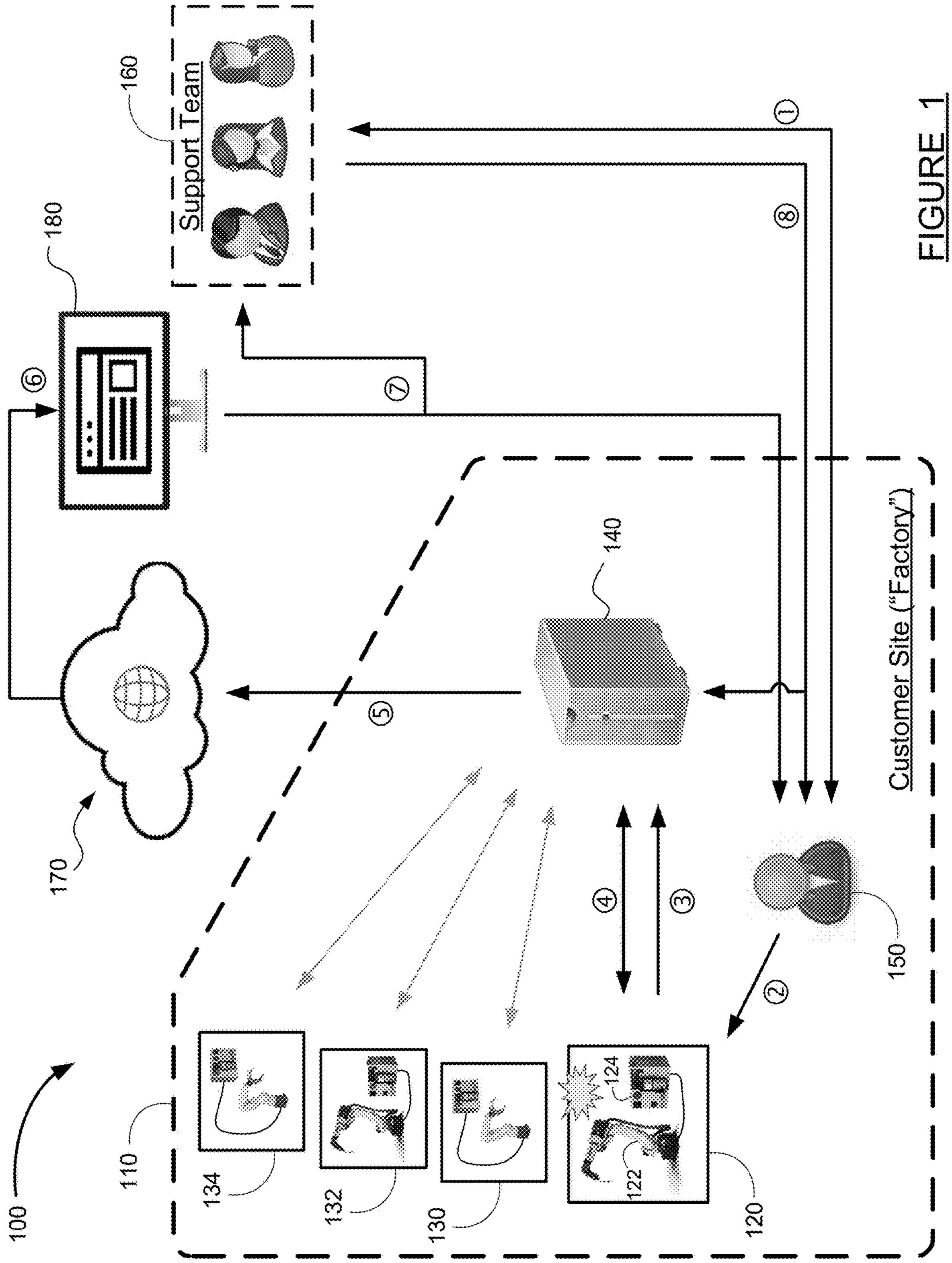
FIG. 1 is a schematic illustration of a system for providing automated support for industrial robots at a customer site by personnel at a remote support center, in a first mode where an operator manually activates the support system, according to an embodiment of the present disclosure.

The following discussion of the embodiments of the disclosure directed to a system and methods for providing automated support for industrial robots is merely exemplary in nature, and is in no way intended to limit the disclosed devices and techniques or their applications or uses.

It is well known to use industrial robots for a variety of manufacturing, assembly and material movement operations. Modern manufacturing facilities often use a variety of robots to automate production processes—including spray painting and welding robots, robots for grasping and moving parts and packages, machine tending robots, and others. However, like any type of machine, robots are susceptible to issues affecting their operation—including various faults, errors, failure modes, etc. These issues can occur in virtually any part of the robot system—including software running on the robot controller, or any electrical or mechanical component or subsystem of the robot. Returning a robot to service as quickly as possible after an issue or problem occurs is of paramount importance to robot operators.

Various methods have been used in efforts to minimize robot downtime. Many robot customers employ proactive measures which monitor many parameters of robots operating in a facility, and use data analytics and prognostics to identify potential problems before failures occur. One such system is disclosed in U.S. patent application Ser. No. 14/951,557 (hereinafter "the '557 application"), subsequently issued as U.S. Pat. No. 10,616,080, which is commonly assigned with the present application, and is hereby incorporated by reference in its entirety. Techniques such as those in the aforementioned patent are effective in that they allow robot components to be inspected, serviced and/or replaced during regular preventive maintenance activities, and thereby reduce the number of issues which occur unexpectedly during production operations. However, in spite of these proactive measures, robots still sometimes experience problems which result in downtime.

When an issue occurs during robot operations, an alarm is activated on the robot controller, indicating the nature and severity of the warning or error. When this happens, in most cases the operator must contact the robot manufacturer's support center and request service assistance. The support center may have a network connection to a server device at the customer site, which enables the transfer of data files from the affected robot's controller to support center technicians who can then attempt to diagnose and resolve the issue. However, existing methods require the support center technician to explain to the robot operator what data files to look for, and the operator must then manually find and email the files to the remote technician. This process can be slow, may need to be repeated as the technician identifies other data that is needed, and does not always recover critical files which capture the state of the robot at the moment the fault occurred.

The present disclosure describes a system and methods for providing automated support for industrial robots, where the disclosed techniques overcome the disadvantages of present remote robot support methods. The presently disclosed techniques automate and standardize the process of capturing data from an affected robot's controller, sending the data from the customer site to a centralized database, diagnosing the problem and sending instructions and corrective actions to the customer site.

FIG. 1 is a schematic illustration of a system 100 for providing automated support for industrial robots at a customer site by personnel at a remote support center, as used in a first mode where an operator manually activates the support system, according to an embodiment of the present disclosure. A customer site 110 represents a factory or other facility where one or more robots are in operation. The term "customer" here refers to the company which buys and operates the robots, which may be a product manufacturer or a food packager for example. A robot manufacturer, on the other hand, sells and services the robots, including providing technical support when a problem occurs.

In this example, the customer site 110 has many robots in operation, including at least a robot 120 and robots 130-134. The robots 120 and 130-134 are merely examples of what may be many robots at the customer site 110, where the robots may be of different types and models, and may be configured to perform a variety of operations, as indicated by the different graphical depictions. The robots at the customer site 110 may include any combination of articulated robots and delta-type (parallel link) robots. As shown in the graphical depictions, each of the robots is understood to include the physical robot and the corresponding robot controller. Thus, the robot 120 includes an articulated robot arm 122 and a robot controller 124.

The robots 120 and 130-134 communicate with a data collection device 140 which is located at the customer site 110. The arrows from the robots 130-134 to the data collection device 140 are deemphasized in the figures because they are not relevant to the following discussion; the active support methodology of the present disclosure is all described with respect to examples involving the robot 120. The data collection device 140 is a computer or server with data storage and processing, a local area network connection (wired or wireless) to all of the robots at the customer site 110, and internet connectivity. The data collection device 140 may be part of an existing system, where the data collection device 140 regularly receives operational parameter data from the controllers of each of the robots 120 and 130-134, and the operational parameter data is analyzed to monitor robot health during normal operations. The data collection device 140 can also receive specific data files from individual ones of the robots at the site 110 in the event of an issue, according to the presently disclosed techniques discussed further below.

An operator 150 at the site 110 is responsible for robot operations, and may be required to perform certain tasks when an issue occurs, as also discussed below. A support team 160 consists of a group of technical experts of the robot manufacturer who can assist in diagnosing and resolving any problems that occur. The support team 160 is located remotely from the customer site 110. The members of the support team 160 may be located at a single location, multiple locations or individually dispersed. It is simply important to understand that they are technical experts who can gain access to data from the customer site 110 in order to help resolve any robot issues which may occur.

Data files from the data collection device 140 may be automatically uploaded via a cloud (Internet) connection 170 to a diagnostic system 180. The diagnostic system 180 globally-accessible server/computer which includes a database, software for performing analytics, diagnostics and communication, and a user interface. In one example, the database in the diagnostic system 180 is configured to manage the data per individual customer site. That is, the operator 150 at the customer site 110 can easily access and view data for his/her site but does not have access to other sites' data, and the members of the support team 160 can easily select all data and files from the site 110 for viewing and analysis via the user interface of the diagnostic system 180.

Figure 2:
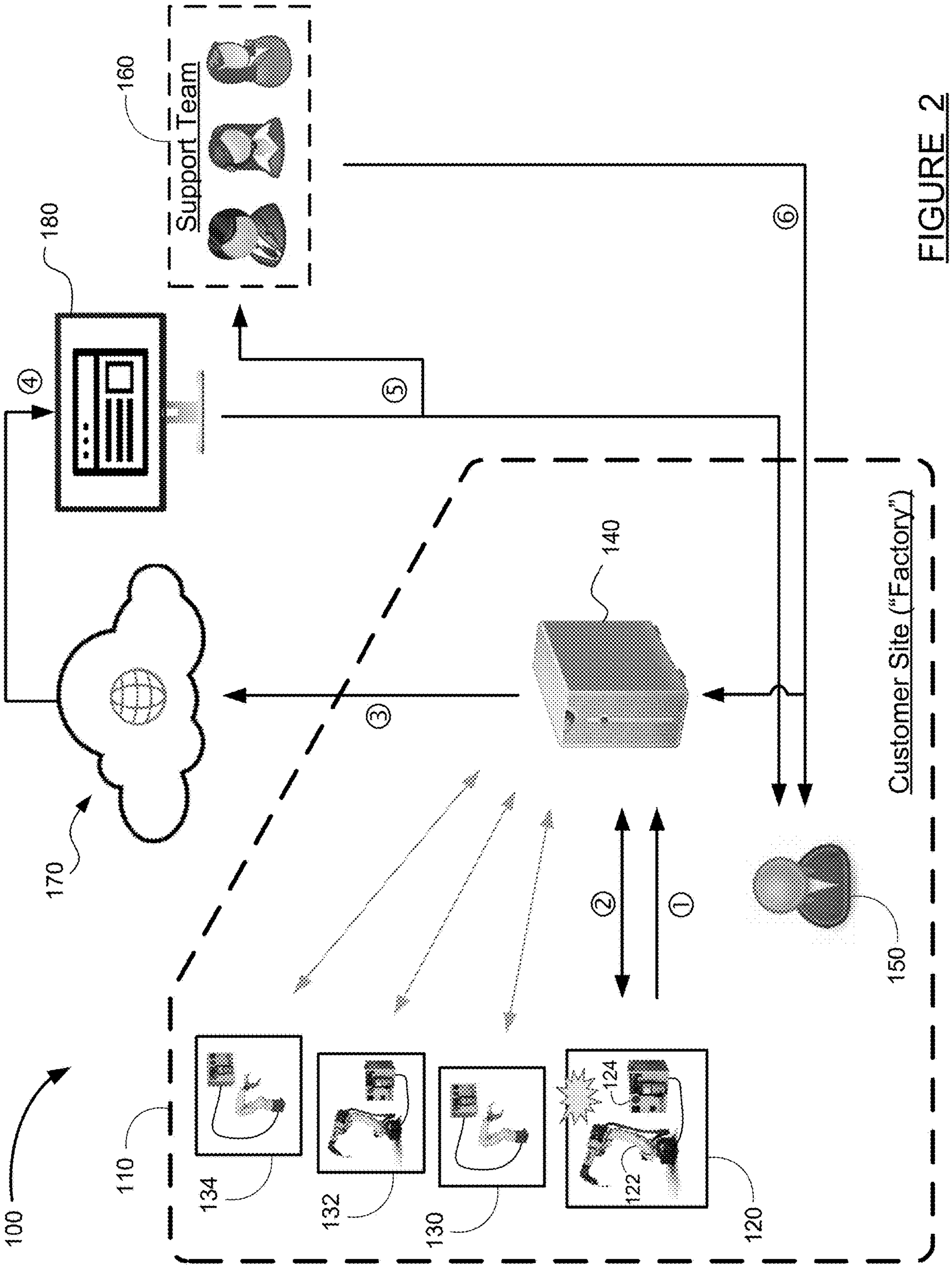
FIG. 2 is a schematic illustration of the automated support system for industrial robots shown in FIG. 1, in a second mode where a robot controller automatically activates the system, according to an embodiment of the present disclosure.
Figure 3:
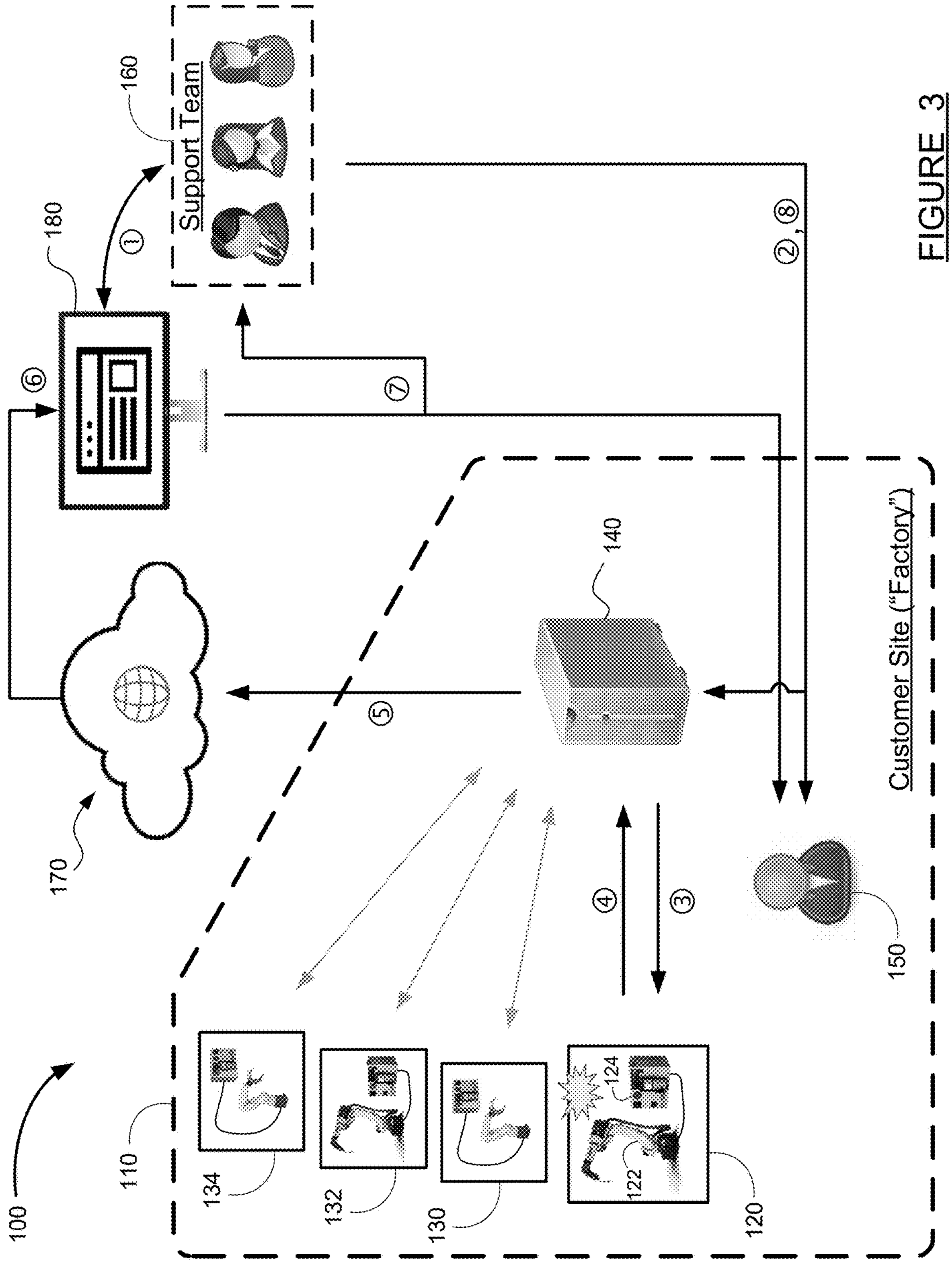
FIG. 3 is a schematic illustration of the automated support system for industrial robots shown in FIG. 1, in a third mode where the remote support center activates the system, according to an embodiment of the present disclosure.

The preceding discussion of FIG. 1 describes the people, devices and connectivity included in the system 100. Following is a discussion of how the system 100 is used in a first mode where the operator 150 manually activates the support system. FIGS. 2 and 3, discussed later, depict other modes of activation and operation of the system 100.

The manual activation technique depicted in FIG. 1 begins when the operator 150 determines that there is a problem with one of the robots at the customer site 110. In this example, the problem or issue is with the robot 120. The issue may be identified by an alarm (audible, visual, electronic notification, or any combination thereof) from the controller 124 of the robot 120. Upon learning of the issue with the robot 120, the operator 150 contacts the support team 160 (indicated by the arrow labeled as step □) and explains the alarm, error or problem that is occurring with the robot 120. The contact may be made by any suitable means—including by phone call, email, regular text message, or a dedicated messaging service available as part of the active support methodology. These various forms of communication are also applicable to any and all subsequent communications between the operator 150 and the support team 160. The arrow for step ① is shown as double-ended, as the support team 160 then provides instructions to the operator 150 for the next step.

At step ②, the operator 150 activates the active support methodology for the robot 120, according to the instructions from the support team 160. This activation may be done physically at the controller 124 of the robot 120, using a "teach pendant" device which communicates with the controller 124, or via a user interface which enables monitoring and control of all of the robots at the customer site 110. Upon activation of the active support methodology, the robot 120 sends a message to the data collection device 140 (step ③) indicating that diagnostic files are required. The message from the robot 120 to the data collection device 140 preferably indicates the exact type (such as a code) of error, fault or alarm that has occurred, which in turn indicates which specific diagnostic files are needed. The diagnostic files may include log files with history data, debug files, and any other files which contain data about the operation of the robot 120 which may be helpful in diagnosing the problem. It can be appreciated that the diagnostic files needed for a collision detection alarm (where some part of the robot 122 collided with some other object) would be much different from those needed for a joint motor failure or a controller operating system error, for example.

At step ④, the data collection device 140 communicates with the robot 120 and pulls (transfers) the required diagnostic files from the controller 124 of the robot 120. The data collection device 140 may make copies of diagnostic files which already exist on the controller 124 of the robot 120, and the data collection device 140 may also execute commands on the controller 124 to generate other debug or log files needed as part of the diagnostic files.

As mentioned above, in some embodiments of the system 100, the data collection device 140 regularly receives operational parameter data from the controllers of each of the robots 120 and 130-134. This operational parameter data is received even when the robots are operating normally, with no issues or errors. The operational parameter data is analyzed, at the data collection device 140 and/or at the diagnostic system 180, to identify any preventive maintenance which may be needed on any of the robots. For example, the operational parameter data could indicate that a particular joint in the robot 132 has reached its service life (in terms of cumulative rotation angle, load cycles, etc.), and that joint should be serviced or replaced. This type of ongoing robot diagnostic activity was disclosed in the '557 application referenced earlier, and is independent of the active support methodology disclosed herein.

At step ⑤, the data collection device 140 sends the diagnostic files (relating to the error on the robot 120) via the cloud 170 to the diagnostic system 180. The diagnostic files are stored in the database of the diagnostic system 180, and when the upload/storage process is complete, the diagnostic system 180 indicates at step ⑥ that the data is ready to access via the user interface. At step ⑦, both the support team 160 and the operator 150 are able to access and download the diagnostic data files which have been captured related to the issue or error on the robot 120.

In some instances, the operator 150 may have enough knowledge and experience to diagnose and resolve the issue by himself/herself, based on the review of the diagnostic data files which have been captured related to the error on the robot 120. In these instances, the active support methodology of the present disclosure provides the benefit of simplifying and accelerating the diagnosis process by automatically capturing the diagnostic files and presenting them to the operator 150. The operator 150 simply had to activate the active support methodology for the robot 120 and then, after a short time, access the diagnostic files from the diagnostic system 180. Using previous/existing methods, the operator 150 would have had to learn from the support team 160 what diagnostic files are needed for the particular error or issue on the robot 120, and how to find, copy or create the required files. Then the operator 150 would have had to analyze the diagnostic files himself/herself, and most likely also email the diagnostic files to the support team 160.

When the support team 160 accesses the diagnostic data files which have been captured related to the error on the robot 120, this may include an automated diagnosis by the diagnostic system 180. For example, the diagnostic system 180 may determine that the diagnostic data matches a known issue which has been resolved in a later version of an operating system software module or configuration file. This diagnosis would be displayed in the user interface when the support team 160 accesses the diagnostic system 180.

In instances where the diagnostic system 180 does not provide a diagnosis of the problem based on the diagnostic data, the support team 160 will attempt to diagnose the problem using their own knowledge and experience, a knowledge database, and all of the data available to them.

When a diagnosis of the problem is made, whether analytically by the support team 160 or automatically by the diagnostic system 180, the diagnosis and possibly a resolution of the problem are provided by the support team 160 at step ⑧. The communication from the support team 160 to the operator 150 at step ⑧ may take many different forms. For example, in the case of a robot collision alert, the support team 160 may instruct the operator 150 to check the area around the robot 120 to ensure that all robot operating zones and safety zones are clear of foreign objects. In the case of a mechanical or electrical failure of a component on the robot 120, the support team 160 may notify the operator 150 that an on-site service technician visit has been scheduled to repair or replace the affected component. In other cases, the support team 160 may ask the operator 150 to perform a relatively simple repair task under the guidance of the support team 160, or using an augmented reality maintenance system. Many other types of communication from the support team 160 to the operator 150 are also possible at step ⑧—including all forms of explanation, status update, instructions for actions to be performed by the operator 150, etc.

The communication from the support team 160 at step ⑧ may also include taking direct action to resolve the problem, in addition to notifying the operator 150 of the action being taken. This is indicated by the branch of the arrow at step ⑧ going to the data collection device 140. For example, when the diagnosis indicates that the issue has been resolved in a later version of an operating system software module or configuration file, the appropriate file(s) can be copied to the data collection device 140 by the support team 160, and the data collection device 140 in turn copies the file(s) to the controller 124 of the robot 120. This may be followed by an automated reboot of the controller 124 commanded by the data collection device 140, at which time the operator 150 would be notified that the robot 120 is ready to return to service. This type of start-to-finish active support provides a tremendous value to the robot operator (customer), where the operator 150 simply triggers the active support methodology to begin, and all of the data retrieval/transfer, diagnosis and resolution steps happen automatically.

Even when no positive diagnosis of the problem can be made, the support team 160 still communicates with the operator 150 at step ⑧, to recommend and discuss other corrective measures that may be taken.

FIG. 2 is a schematic illustration of the automated support system 100 for industrial robots shown in FIG. 1, as used in a second mode where a robot controller automatically activates the system, according to an embodiment of the present disclosure. In the automatic activation mode of FIG. 2, the active support methodology is initiated with no action taken by the operator 150.

The automatic activation technique depicted in FIG. 2 begins when the controller 124 determines that there is a problem with the robot 120. The operator 150 may also be aware of the problem because of an alarm. To activate the active support methodology, the robot 120 sends a message to the data collection device 140 (step ①) indicating that an issue has been detected and that diagnostic files are required. The message from the robot 120 to the data collection device 140 preferably indicates the exact type of error, fault or alarm that has occurred (by identifying an error or fault code), which in turn indicates which specific diagnostic files are needed. As discussed above with respect to FIG. 1, the diagnostic files may include log files with history data, debug files, and any other files which contain data about the operation of the robot 120 which may be helpful in diagnosing the problem.

At step ②, the data collection device 140 communicates with the robot 120 and pulls (transfers) the required diagnostic files from the controller 124 of the robot 120. The data collection device 140 may make copies of diagnostic files which already exist on the controller 124 of the robot 120, and the data collection device 140 may also execute commands on the controller 124 to generate other debug or log files needed as diagnostic files.

At step ③, the data collection device 140 sends the diagnostic files (relating to the error on the robot 120) via the cloud 170 to the diagnostic system 180. The diagnostic files are stored in the database of the diagnostic system 180, and when the upload/storage process is complete, the diagnostic system 180 indicates at step ④ that the data is ready to access via the user interface. At step ⑤, both the support team 160 and the operator 150 are able to access and download the diagnostic data files which have been captured related to the error on the robot 120. Notification that the data files are available is provided to the support team 160 and the operator 150 via email or other means such as messaging.

The remaining diagnosis, communication and resolution of the problem (step ⑥) is the same in FIG. 2 (automatic activation) as it was in FIG. 1 (manual activation). This includes diagnosis of the problem by the diagnostic system 180 and/or the support team 160, communication of the diagnosis by the support team 160 to the operator 150, action by the operator 150 to resolve the problem, and when possible, action by the support team 160 to resolve the problem by sending files and/or commands (e.g., install new version of a configuration file and reboot controller) to the data collection device 140 for implementation on the robot 120. Diagnosis and resolution of the problem also may include the operator 150 diagnosing and resolving the problem based on his/her own review of the diagnostic files.

The automatic activation of the active support methodology, depicted in FIG. 2, provides an even faster and easier support solution for the customer. In some cases, the problem is resolved and the robot is returned to active service with no action at all by the operator 150, who is simply made aware of what is happening at steps ⑤ and ⑥. Even when complete resolution of the problem is not possible, such as when a robot component needs to be replaced by a service technician during an on-site visit, the active support methodology is fast and easy for the operator 150—as there is no need to seek support team instructions on diagnostic files needed, nor for identification and emailing of the diagnostic files to the support team 160.

FIG. 3 is a schematic illustration of the automated support system 100 for industrial robots shown in FIGS. 1 and 2, as used in a third mode where the remote support team 160 activates the system, according to an embodiment of the present disclosure. Again in the remote activation mode of FIG. 3, the active support methodology is initiated with no action taken by the operator 150.

The automatic activation technique depicted in FIG. 3 begins (step ①) when the support team 160, monitoring operational data through the diagnostic system 180, spots an issue on a particular robot (the robot 120 in this example). As mentioned earlier, the diagnostic system 180 periodically receives robot operational parameter data from the customer site 110, and the diagnostic system 180 includes algorithms which analyze the data to identify parameters which are outside of their normal range, or trending in an abnormal direction, etc. Thus, by regularly monitoring the diagnostic system 180, the support team 160 may identify an issue on a robot before the operator 150 identifies the issue or an alarm is triggered on the robot controller itself.

At step ②, the support team 160 notifies the operator 150 that an issue or potential problem has been identified on the robot 120, and also requests the appropriate diagnostic files from the data collection device 140. As discussed previously, the diagnostic files may include log files with history data, debug files, and any other files which contain data about the operation of the robot 120 which may be helpful in diagnosing the problem. At step ③, the data collection device 140 communicates with the robot 120 to indicate that certain diagnostic files are needed, and at step ④, the required diagnostic files are transferred from the controller 124 to the data collection device 140.

At step ⑤, the data collection device 140 sends the diagnostic files via the cloud 170 to the diagnostic system 180. The diagnostic files are stored in the database of the diagnostic system 180, and when the upload/storage process is complete, the diagnostic system 180 indicates at step ⑥ that the data is ready to access via the user interface. At step ⑦, both the support team 160 and the operator 150 are able to access and download the diagnostic data files which have been captured related to the issue or error on the robot 120. Notification that the data files are available is provided to the support team 160 and the operator 150 at step ⑦ via email or other means such as messaging.

The remaining diagnosis, communication and resolution of the issue or problem (step ⑧) is the same in FIG. 3 (support team activation) as it was in FIG. 1 (manual activation) and FIG. 2 (automatic activation). This includes diagnosis of the problem by the diagnostic system 180 and/or the support team 160, communication of the diagnosis by the support team 160 to the operator 150, action by the operator 150 when possible to resolve the problem, and action by the support team 160 when possible to resolve the issue or problem by sending files and/or commands (e.g., install new version of a configuration file and reboot controller) to the data collection device 140 for implementation on the robot 120. Diagnosis and resolution of the problem also may include the operator 150 diagnosing and resolving the problem based on his/her own review of the diagnostic files.

The support team activation of the active support methodology, depicted in FIG. 3, provides another fast and easy support solution for the customer. In some cases, the problem is resolved and the robot is returned to active service with no action at all by the operator 150, who is simply made aware of what is happening at steps ②, ⑦ and ⑧. Even when complete resolution of the problem is not possible, such as when a robot component needs to be replaced by a service technician during an on-site visit, the active support methodology is faster and easier than existing methods which require the operator 150 to identify, copy and email diagnostic files to the support team 160.

Figure 4:
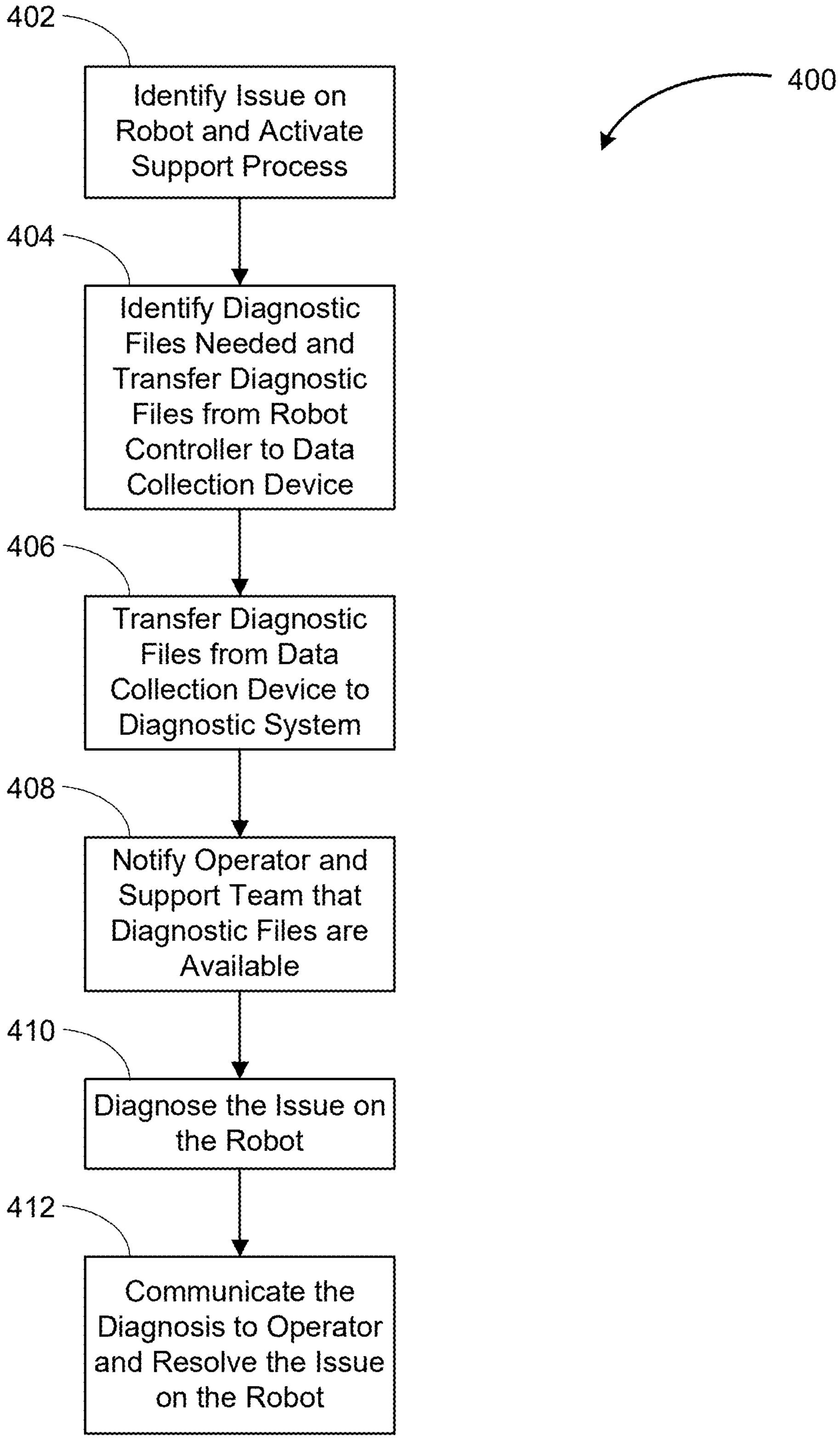
FIG. 4 is a flowchart diagram depicting a method for providing active support for industrial robots, according to an embodiment of the present disclosure.

FIG. 4 is a flowchart diagram 400 depicting a method for providing active support for industrial robots, according to an embodiment of the present disclosure. The method of FIG. 4 is implemented using the system 100 illustrated in FIGS. 1-3. At box 402, the active support methodology is activated when an issue or problem with a robot at a customer site is identified. The issue or problem may be identified by a robot operator at the customer site, by the controller of the robot itself, or by a robot manufacturer's support team which is located remotely from the customer site. At box 404, diagnostic files relevant to the problem on the robot are identified and transferred from the robot controller to a data collection device at the customer site. The diagnostic files may be identified by the support team and communicated to the data collection device, or the files may be identified by the data collection device itself based on an error or alarm code which is provided by the robot controller.

At box 406, the diagnostic files are transferred from the data collection device at the customer site to a database which is part of a cloud-based diagnostic system. At box 408, the diagnostic system notifies the support team and the robot operator that the diagnostic files are available for viewing and download. At box 410, the issue with the robot is diagnosed. This may include either the robot operator or the support team diagnosing the issue after viewing the diagnostic files, or it may include the diagnostic system diagnosing the issue after analyzing the diagnostic files.

At box 412, the support team communicates the diagnosis of the issue to the robot operator, and if possible, the support team resolves the issue by sending files and/or commands to the robot controller via the data collection device. Resolving the issue may also include the robot operator performing a repair task or some other action on the affected robot or its controller based on either the operator's own diagnosis or the communication from the support team. In some cases, resolving the issue can only be completed by an on-site visit by a trained service technician, in which case the service technician visit is scheduled by the support team.

Throughout the preceding discussion, various computers and controllers are described and implied. It is to be understood that the software applications and modules of these computers and controllers are executed on one or more computing devices having a processor and a memory module. In particular, this includes a processor in each of the controllers of the robots 120 and 130-134, the data collection device 140 and the diagnostic system 180. Specifically, the processors in these devices are configured to identify an issue on a robot, determine which diagnostic files are needed to assist in diagnosis of the issue, transfer the required diagnostic files to the data collection device and on to the cloud-based diagnostic system, and analyze and communicate the data and the diagnosis, in the manner described throughout the foregoing disclosure.

As outlined above, the disclosed techniques for providing automated support for industrial robots provide significant advantages over prior art methods. Using the disclosed active support system and methods, all required diagnostic files are captured at the time when an alarm or fault occurs. The diagnostic files are then automatically uploaded from the customer site to a cloud-based diagnostic system for access by a team of trained support personnel. There is no need for an inexperienced robot operator to attempt to find the needed diagnostic files and then manually email the files to someone on the support team. This results in faster and more reliable diagnosis of robot issues, and more rapid issue resolution and return to service of the robot.

While a number of exemplary aspects and embodiments of the system and methods for providing automated support for industrial robots have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for providing active support for industrial robots, said method comprising:

determining that a robot at a facility has experienced an issue needing resolution;

identifying one or more diagnostic files needed for diagnosing the issue;

transferring the diagnostic files, by a data collection device located at the facility, from a controller of the robot to the data collection device;

uploading the diagnostic files by the data collection device to a cloud-based diagnostic system located remotely from the facility;

notifying a robot operator at the facility and a support team located remotely from the facility, by the diagnostic system, that the diagnostic files are available;

determining a diagnosis of the issue based on the diagnostic files; and resolving the issue based on the diagnosis, wherein determining that the robot has experienced the issue is performed using a particular support mode selected from a group consisting of: a manual activation mode, an automatic activation mode, and a support team activation mode, where the manual activation mode is initiated by the robot operator who notifies the support team of the issue, whereupon the support team provides instructions to the robot operator, who then records the issue on the controller of the robot according to the instructions from the support team, and where the automatic activation mode is initiated by the controller of the robot which notifies the data collection device of the issue, and the support team activation mode is initiated by the support team who is monitoring robot operational data through the diagnostic system, where the support team notifies the robot operator of the issue, and the support team also submits a request to the data collection device for the diagnostic files.

2. The method according to claim 1 wherein identifying one or more diagnostic files is performed by the controller of the robot or the data collection device based on an alarm or error code.

3. The method according to claim 1 wherein identifying one or more diagnostic files is performed by the support team.

4. The method according to claim 1 wherein determining the diagnosis of the issue is performed by the diagnostic system by comparing the diagnostic files to files stored in a knowledge base of prior robot issues and diagnoses.

5. The method according to claim 1 wherein determining the diagnosis of the issue is performed by the support team.

6. The method according to claim 1 wherein determining the diagnosis of the issue is performed by the robot operator.

7. The method according to claim 1 wherein resolving the issue based on the diagnosis includes the robot operator or a service technician performing an action on the robot or the controller.

8. The method according to claim 1 wherein resolving the issue based on the diagnosis includes the support team electronically sending one or more of software files, configuration files and command instructions to the controller of the robot.

9. The method according to claim 1 wherein the diagnostic files include one or more of log files with history data, debug files, backup files, software program and configuration files, and files containing data about the robot at a moment when the issue occurred.

10. The method according to claim 1 wherein the issue needing resolution includes a fault or error in hardware or software of the controller, a robot collision alert, or a problem with any mechanical or electrical component or subsystem of the robot.

11. The method according to claim 1 wherein the controller of the robot and the data collection device are computing devices having a processor and memory, and the diagnostic system includes a computing device, a database, diagnostic software and a user interface.

12. The method according to claim 1 wherein the robot is one of a plurality of robots operating at the facility, and other data collection devices at other facilities also communicate with the diagnostic system.

13. A method for providing active support for industrial robots, said method comprising:

determining by a controller of a robot that the robot has experienced an issue needing resolution;

identifying diagnostic files needed for diagnosing the issue;

transferring one or more diagnostic files, by a data collection device co-located at a facility with the robot, from the controller of the robot to the data collection device, where the diagnostic files needed for diagnosing the issue are identified by the controller or the data collection device based on an alarm code identifying the issue;

uploading the diagnostic files by the data collection device to a cloud-based diagnostic system located remotely from the facility;

notifying a robot operator at the facility and a support team located remotely from the facility, by the diagnostic system, that the diagnostic files are available;

determining a diagnosis of the issue based on the diagnostic files; and resolving the issue based on the diagnosis, wherein determining by the controller that the robot has experienced the issue is performed using a particular support mode selected from a group consisting of, a manual activation mode, an automatic activation mode, and a support team activation mode, where the manual activation mode is initiated by the robot operator who notifies the support team of the issue, whereupon the support team provides instructions to the robot operator, who then records the issue on the controller of the robot according to the instructions from the support team, and where the automatic activation mode is initiated by the controller of the robot which notifies the data collection device of the issue, and the support team activation mode is initiated by the support team who is monitoring robot operational data through the diagnostic system, where the support team notifies the robot operator of the issue, and the support team also submits a request to the data collection device for the diagnostic files, and the data collection device communicates the issue to the controller.

14. The method according to claim 13 wherein determining the diagnosis of the issue is performed by the diagnostic system by comparing the diagnostic files to files stored in a knowledge base of prior robot issues and diagnoses, and resolving the issue based on the diagnosis includes the support team electronically sending one or more of software files, configuration files and command instructions to the controller of the robot.

15. A system for providing active support for industrial robots, said system comprising:

a plurality of robots and controllers operating at a facility;

a data collection device, having a processor and memory, located at the facility and in communication with the controllers; and a diagnostic system, having a processor and memory, a database, diagnostic software and a user interface, located remotely from the facility and accessible via Internet connection, wherein, when an issue with a particular one of the robots is identified, one or more diagnostic files are identified as being needed to diagnose the issue, the diagnostic files are automatically transferred from the controller of the particular robot to the data collection device and uploaded by the data collection device to the diagnostic system, a robot operator at the facility and a support team located remotely from the facility are notified by the diagnostic system that the diagnostic files are available, a diagnosis of the issue is determined based on the diagnostic files, and the issue is resolved based on the diagnosis, wherein identifying the issue with the particular one of the robots is performed using a support mode selected from a group consisting of: a manual activation mode, an automatic activation mode, and a support team activation mode, where the manual activation mode is initiated by the robot operator who notifies the support team of the issue, whereupon the support team provides instructions to the robot operator, who then records the issue on the controller of the particular robot according to the instructions from the support team, and where the automatic activation mode is initiated by the controller of the particular robot which notifies the data collection device of the issue, and the support team activation mode is initiated by the support team who is monitoring robot operational data through the diagnostic system, where the support team notifies the robot operator of the issue, and the support team also submits a request to the data collection device for the diagnostic files.

16. The system according to claim 15 wherein the diagnostic files include one or more of log files with history data, debug files, backup files, software program and configuration files, and files containing data about the particular robot at a moment when the issue occurred.

17. The system according to claim 15 wherein the one or more diagnostic files are identified by the controller of the particular robot, by the data collection device, or by the support team, based on an alarm or error code.

18. The system according to claim 15 wherein the diagnosis of the issue is determined by the diagnostic system by comparing the diagnostic files to files stored in a knowledge base of prior robot issues and diagnoses, or by the support team or the robot operator.

19. The system according to claim 15 wherein the issue is resolved by the robot operator or a service technician performing an action on the particular robot or the controller of the particular robot, or by the support team electronically sending one or more of software files, configuration files and command instructions to the controller of the particular robot.

20. The system according to claim 15 wherein the issue includes a fault or error in hardware or software of the controller of the particular robot, a robot collision alert, or a problem with any mechanical or electrical component or subsystem of the particular robot.

* * * * *